US010186935B2

United States Patent
Hattori et al.

(10) Patent No.: US 10,186,935 B2
(45) Date of Patent: Jan. 22, 2019

(54) INVERTER-INTEGRATED ELECTRIC COMPRESSOR

(71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Kiyosu (JP); Masahiko Asai, Kiyosu (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 605 days.

(21) Appl. No.: 14/787,173

(22) PCT Filed: May 19, 2014

(86) PCT No.: PCT/JP2014/063165
§ 371 (c)(1),
(2) Date: Oct. 26, 2015

(87) PCT Pub. No.: WO2014/203665
PCT Pub. Date: Dec. 24, 2014

(65) Prior Publication Data
US 2016/0111942 A1     Apr. 21, 2016

(30) Foreign Application Priority Data
Jun. 19, 2013   (JP) .................................. 2013-128546

(51) Int. Cl.
*H02K 11/33*       (2016.01)
*H02K 5/22*        (2006.01)
(Continued)

(52) U.S. Cl.
CPC .............. *H02K 11/33* (2016.01); *F04B 35/04* (2013.01); *F04B 39/121* (2013.01); *H02K 5/22* (2013.01);
(Continued)

(58) Field of Classification Search
CPC .... H02K 11/02; H02K 11/33; H02K 2203/03; F04C 2240/803; F04C 2240/808; H02M 7/003
See application file for complete search history.

(56) References Cited

U.S. PATENT DOCUMENTS

| 8,159,100 B2 * | 4/2012 | Tanaka .................. | F04B 39/121 |
| | | | 310/68 R |
| 8,939,739 B2 * | 1/2015 | Kinoshita ............. | F04C 23/008 |
| | | | 310/68 R |

(Continued)

FOREIGN PATENT DOCUMENTS

| CN | 1854520 A | 11/2006 |
| CN | 102144354 A | 8/2011 |

(Continued)

OTHER PUBLICATIONS

Notice of Granting a Patent Right for Invention dated Jan. 5, 2017 in corresponding Chinese Application No. 201480024572.1 with an English Translation.

(Continued)

*Primary Examiner* — Burton Mullins
(74) *Attorney, Agent, or Firm* — Birch, Stewart, Kolasch & Birch, LLP

(57) ABSTRACT

In an inverter-integrated electric compressor, a sub-board (26) divided from a main board is mounted with a communication circuit (25) and is connected to a communication harness (24) via a connector (34). Further, the sub-board (26) is configured to be connected to the main board via a (Continued)

connection connector (35) and to be fixed on the side of a housing (2) at three or more portions by fixing screws (32), and is configured such that the connector (34) and the connection connector (35) are respectively arranged close to the fixing screws (32), such that a communication line (39) connected to a noise suppression component (41) connected to a frame ground of the sub-board (26) is arranged between the connector (34) and the connection connector (35), and such that a power source line (40) connected to noise suppression components (42, 43) connected to the frame ground is arranged along a triangular line passing through the vicinity of the fixing screw (32) provided at a portion other than the portions of the fixing screws (32) provided close to the connector (34) and the connection connector (35). The frame ground of the sub-board (26) is grounded on the side of the housing (2) via the fixing screws (32).

5 Claims, 7 Drawing Sheets

(51) Int. Cl.
*F04B 35/04* (2006.01)
*F04B 39/12* (2006.01)
*H02K 11/02* (2016.01)

(52) U.S. Cl.
CPC ........ *H02K 11/02* (2013.01); *F04C 2240/803* (2013.01); *F04C 2240/808* (2013.01); *H02K 2203/03* (2013.01)

(56) References Cited

U.S. PATENT DOCUMENTS

| | | | |
|---|---|---|---|
| 2009/0246047 A1 | 10/2009 | Hattori et al. | |
| 2010/0247349 A1 | 9/2010 | Asai et al. | |
| 2011/0236235 A1 | 9/2011 | Hattori et al. | |
| 2012/0326799 A1 | 12/2012 | Takahashi et al. | |
| 2013/0224050 A1* | 8/2013 | Nakagami | F01C 21/10 417/410.1 |
| 2015/0289391 A1 | 10/2015 | Nakatsu et al. | |

FOREIGN PATENT DOCUMENTS

| | | |
|---|---|---|
| CN | 102668355 A | 9/2012 |
| EP | 2 233 741 A1 | 9/2010 |
| JP | 2009-247066 A | 10/2009 |
| JP | 2010-163957 A | 7/2010 |
| JP | 2011-135705 A | 7/2011 |
| JP | 2011-214432 A | 10/2011 |
| JP | 2011-220308 A | 11/2011 |
| JP | 2011-236858 A | 11/2011 |
| JP | 2012-120279 A | 6/2012 |
| JP | 2013-51882 A | 3/2013 |

OTHER PUBLICATIONS

Chinese Office Action and Search Report, dated Aug. 3, 2016, for Chinese Application No. 201480024572.1, with an English translation.

* cited by examiner

INVERTER-INTEGRATED ELECTRIC COMPRESSOR

TECHNICAL FIELD

The present invention relates to an inverter-integrated electric compressor having an inverter apparatus integrally incorporated in an inverter accommodating section of a housing.

BACKGROUND ART

In a compressor for an air conditioner, which is mounted to an EV vehicle, an HEV vehicle, and the like, an electric compressor having an inverter apparatus integrally incorporated therein is used. This inverter-integrated electric compressor is driven in such a manner that high voltage DC power supplied from a power source unit mounted to a vehicles is converted into three-phase AC power in the inverter apparatus and is applied to an electric motor. The inverter apparatus is configured by a coil and a capacitor which configure a noise removing filter circuit, a plurality of semiconductor switching elements such as IGBTs which configure a power conversion switching circuit, an inverter circuit including the filter circuit and the switching circuit, and a circuit board or the like on which a control circuit of the inverter circuit is mounted, and is integrally incorporated into an inverter accommodating section provided at an outer periphery of a housing.

For the inverter-integrated electric compressor mounted to a vehicle, severe electromagnetic compatibility (hereinafter simply referred to as EMC characteristics) is required in order to avoid malfunctions of other mounted devices and of the compressor due to electromagnetic noise interference. In order to meet standards determined by each car manufacturer itself according to the International Standard, it is necessary to pass a radiation immunity (resistance) test and an injection immunity test for electromagnetic noise.

In order to meet EMC characteristics, PTL 1 provides an inverter-integrated electric compressor configured to improve the noise immunity performance in such a manner that weak electric systems, such as a harness, a cable, a control circuit board, and the like, which are easily affected by noise, are arranged in a closed space in a case partitioned by a board base, in order to arrange the weak electric systems away from a power module including semiconductor switching elements, a gate driver driving the power module, and the like, that a case GND of the control circuit board is supplied from the case via the board base, and that a noise removing capacitor connected to a chassis GND is connected to a signal wiring between a connector of the control circuit board, and a connector connected to an external control wiring connected to the control circuit board.

CITATION LIST

Patent Literature

{PTL 1}
Japanese Unexamined Patent Application, Publication No. 2011-135705

SUMMARY OF INVENTION

Technical Problem

In the inverter-integrated electric compressor configured as proposed in PTL 1, the noise resistance is improved in such a manner that the control wiring from outside is connected to the control circuit board via the connector, the board connector, and via the signal wiring between the connector and the board connector, and the noise removing capacitor connected to GND is connected to the signal wiring. However, in PTL 1, there is disclosed no protection measure against noise entering into the control circuit board via a power source wiring and a power source line, or noise emitted via the power source wiring and the power source line.

In addition to the control wiring, a low-voltage power source wiring for operating the control circuit is connected to the control circuit board. Since noise entering or emitted via the power source wiring is concerned, a noise protection measure for the power source wiring and the power source line is also required. However, in the case of a control circuit board having a single board configuration, when noise protection measures are separately provided, the electrical connecting structure is complicated, and hence there occur problems, such as a problem that the noise protection measure becomes complicated so that it is difficult to take an appropriate measure.

The present invention has been made in view of the above-described circumstances. An object of the present invention is to provide an inverter-integrated electric compressor capable of improving noise immunity performance by reducing noise entering or emitted via a communication harness including a communication line and a power source line.

Solution to Problem

In order to solve the problems described above, an inverter-integrated electric compressor of the present invention adopts the following solutions.

That is, the inverter-integrated electric compressor according to the present invention is featured in that, in the inverter-integrated electric compressor in which an inverter apparatus including an inverter circuit board is integrally incorporated in an inverter accommodating section of a housing, in that the inverter circuit board is divided into a main board installed in an upper portion of the inverter accommodating section, and a small sub-board installed in a portion below the main board, and in that the sub-board is mounted with a communication circuit and connected to a communication harness via a connector, and is also connected to the main board via a connection connector and is tightened and fixed, via fixing screws, at three or more points arranged in a polygonal pattern on the side of the housing, the sub-board being configured such that the connector and the connection connector are respectively arranged close to two of the fixing screws, such that a communication line, connected to a noise suppression component connected to a frame ground of the sub-board, is arranged between the connector and the connection connector, such that a power source line connected to a noise suppression component connected to the frame ground is arranged along a triangular line passing through the vicinity of the fixing screw provided at an other portion other than the portions of the two fixing screws, and such that the frame ground of the sub-board is grounded on the side of the housing via the fixing screws.

In this configuration, a board mounted with the communication circuit and connected to the communication harness is formed as the sub-board separated from the main board, and the noise suppression components connected to the frame ground are respectively connected to the communication line and the power source line which are arranged on the sub-board. Thereby, noise entering the inverter apparatus via the communication harness is removed on the sub-board to be prevented from entering the control circuit on the main board. Further, while noise generated by the switching circuit, or the like, of the inverter apparatus reaches the communication harness from the main board via the sub-board, the noise is removed on the sub-board to be prevented from being emitted to the outside. In this configuration, the entering noise and the generated noise are transferred, via the fixing screws, from the frame ground of the sub-board to the side of the housing and are released to the ground. Therefore, the noise, entering or emitted via the communication line and the power source line which configure the communication harness, is reduced, so that the noise immunity performance can be improved. Also, all the noise measures can be implemented on the sub-board, so that the noise measure configuration can be simplified, and electromagnetic noise can be more accurately removed. Further, since the sub-board is arranged at a position below the main board and is arranged close to the housing so that a fixed distance from the main board is maintained, the noise interference between the sub-board and the main board is prevented, and thereby the noise resistance on the side of the sub-board can be more improved. Further, the inverter circuit board is divided into two boards, and thereby the area of each of the boards is miniaturized so that the vibration resistance can be improved.

Further, in the inverter-integrated electric compressor, the sub-board is formed as a triangular or quadrilateral board, and is tightened and fixed on the side of the housing by the fixing screws provided at three or four portions arranged at the corners of the triangular or quadrilateral board.

With this configuration, the sub-board can be minimized as much as possible, and also the noise, flowing through the communication line and the power source line which are arranged along the geometric configuration, is removed by the noise suppression components arranged close to the fixing screws provided at the plurality of portions. From the fixing screws provided close to the noise suppression components, the noise is transferred to the side of the housing via the frame grounded to each of the noise suppression components, so as to be released to the ground. Therefore, the portions for arranging the noise suppression components and the grounding portions can be surely secured on the miniaturized sub-board, so that the noise resistance can be more improved.

Further, in each of the above-described inverter-integrated electric compressors, via the noise suppression component provided close to the connector connected to the communication harness, and via the noise suppression component provided close to the fixing screw provided at the other portion, the power source line is grounded to the fixing screw provided close to the connector and to the fixing screw provided at the other portion.

With this configuration, the noise suppression components are arranged at positions suitable for the power source line arranged on the sub-board, and via the frame ground of the sub-board, the noise suppression components can be respectively grounded to the fixing screws closest to the noise suppression components. Thereby, entering or emission noise can be removed via the sub-board to be promptly transferred to the ground on the side of the housing. Therefore, the noise measure can be taken easily, surely and simply, which makes it possible to surely meet the noise immunity performance required from each car manufacturer.

Further, in each of the above-described inverter-integrated electric compressors, via the noise suppression component arranged close to the connection connector, the communication line is grounded to the fixing screw close to the connection connector.

With this configuration, the noise suppression components are arranged at position suitable for the communication line arranged on the sub-board, and via the frame ground of the sub-board, the noise suppression components are grounded to the fixing screws at closest positions. Thereby, entering noise or emission noise can be removed via the sub-board to be promptly transferred to the ground on the side of the housing. Therefore, the noise measure can be taken easily, surely and simply, which makes it possible to surely meet the noise immunity performance required from each car manufacturer.

Further, in the above-described inverter-integrated electric compressor, at least one or more of the noise suppression components may be provided at middle positions which are provided on the power source line and not close to the fixing screws.

With this configuration, at least one or more of the noise suppression components are provided at middle positions between the two fixing screws each provided at a portion close to the power source line arranged along the triangular line, and thereby the number of the noise suppression components can be increased so that the noise rejection performance can be further improved. Therefore, the noise resistance on the side of the power source line is further improved so that the EMC characteristics as a whole can be further improved.

Advantageous Effects of Invention

With the present invention, the sub-board, which is mounted with the communication circuit and connected to the communication harness, is separated from the main board. The noise suppression components respectively connected to the frame ground are connected to the communication line and the power source line which are arranged on the sub-board. Thereby, noise entering the side of the inverter apparatus via the communication harness can be removes on the sub-board to be prevented from reaching the control circuit on the main board. Further, while noise, generated by the switching circuit, and the like, on the side of the inverter apparatus, flows from the main board to the communication harness via the sub-board, the noise can be removed on the sub-board to be prevented from being emitted to the outside from the communication harness. The entering noise and the generated noise are transferred to the side of the housing from the frame ground of the sub-board via the fixing screws, and then released to the ground. Therefore, the noise, entering or emitted via the communication line and the power source line each included in the communication harness, is reduced so that the noise immunity performance can be further improved. Also, all the noise measures can be taken on the sub-board, and thereby the configuration of the measure can be simplified so that the electromagnetic noise can be more accurately removed. Further, since the sub-board is arranged at a position which is below the main board and closer to the housing so that a fixed distance from the main board is maintained, the noise interference between the sub-board and the main board is prevented, so that the noise resistance on the side of the sub-board can be more improved. Further, the inverter circuit board is divided into the two boards, and thereby the area of each of the boards can be miniaturized, so that the vibration resistance can be improved.

DESCRIPTION OF EMBODIMENTS

In the following, an embodiment according to the present invention will be described with reference to FIG. 1 to FIG. 7.

Figure 1:
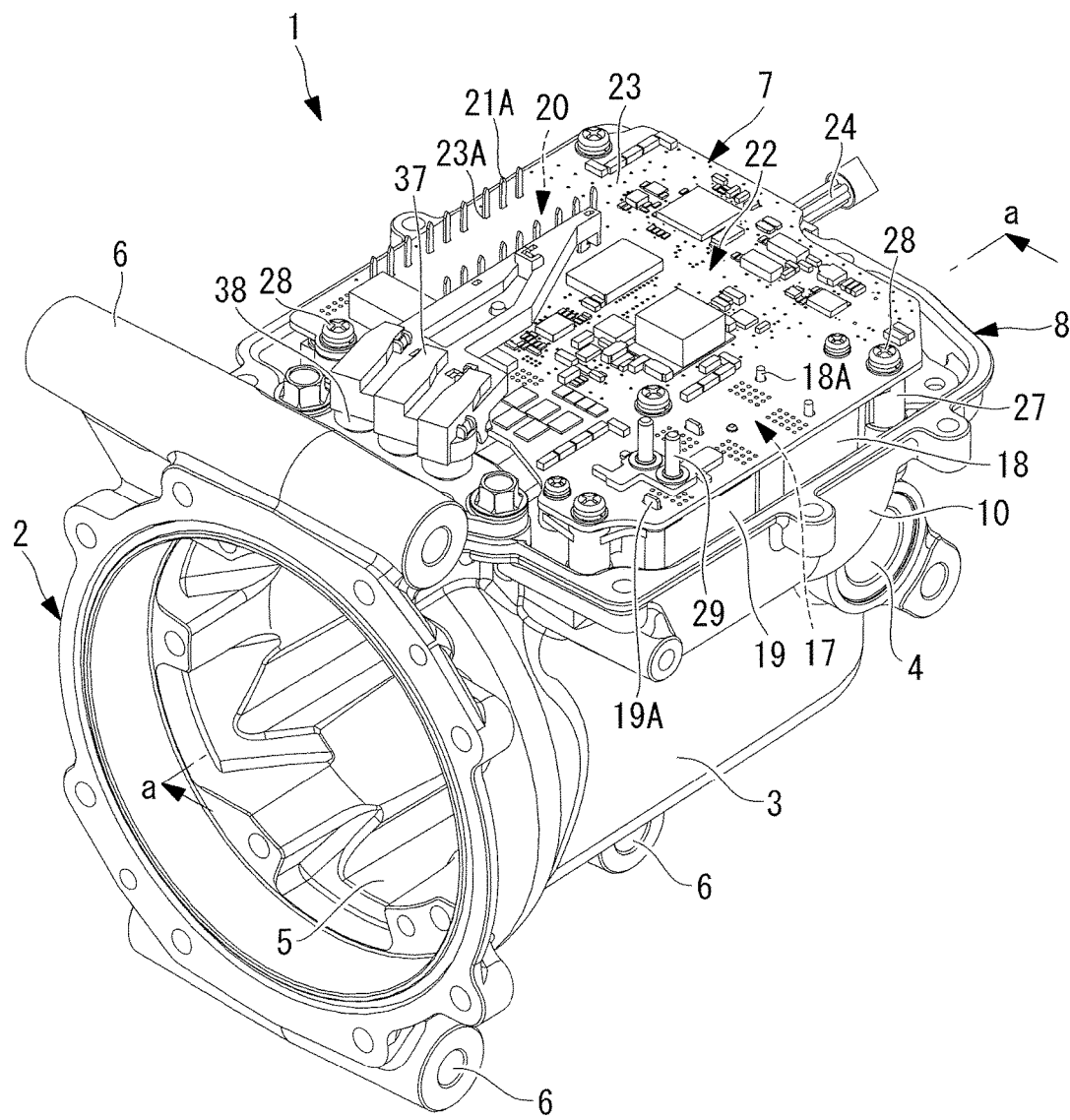
FIG. 1 is a perspective view showing a configuration of a main part of an inverter-integrated electric compressor according to an embodiment of the present invention.
Figure 2:
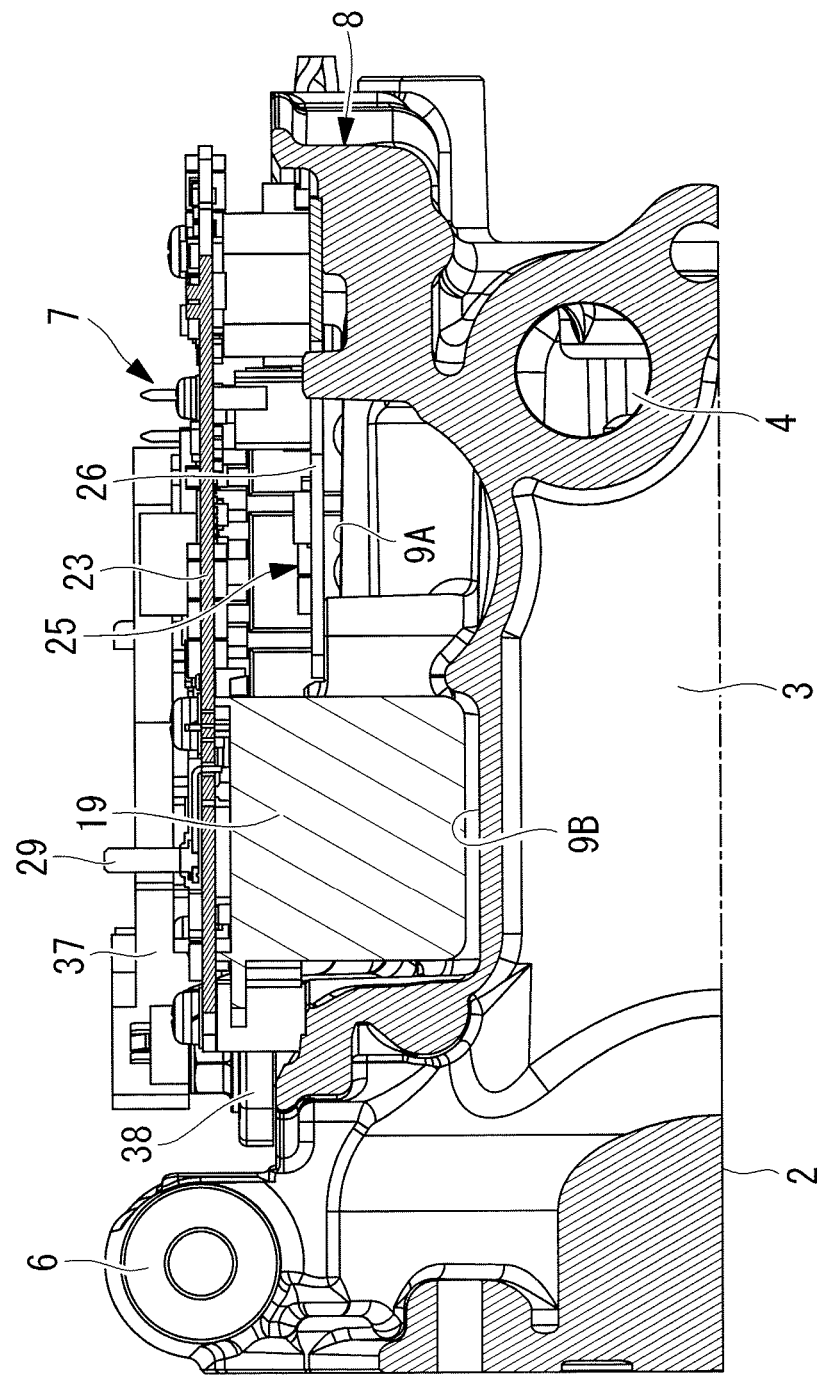
FIG. 2 corresponds to a longitudinal sectional view taken along line a-a in FIG. 1.
Figure 3:
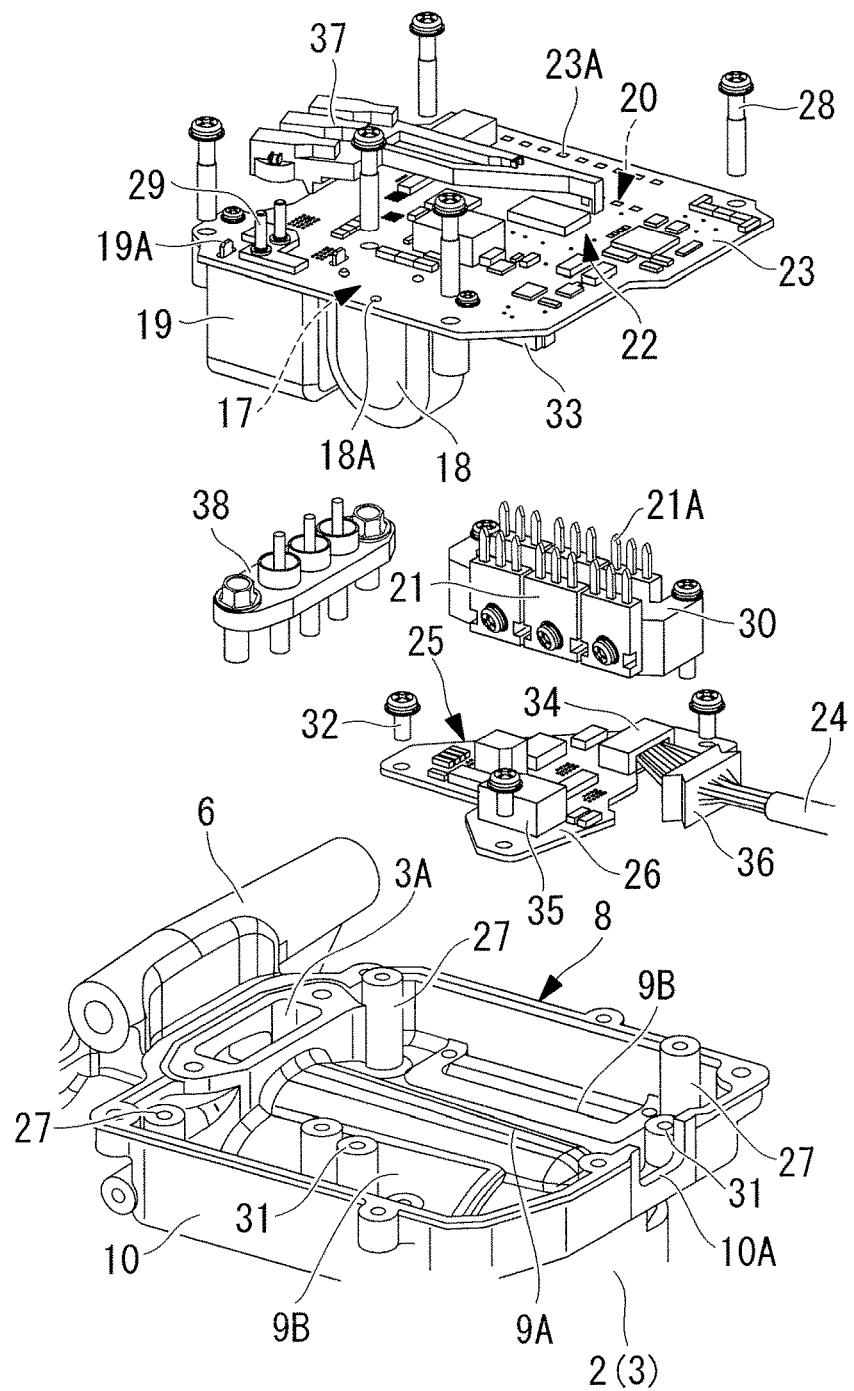
FIG. 3 is an exploded perspective view of an inverter apparatus incorporated in an inverter accommodating section of the inverter-integrated electric compressor.
Figure 4:
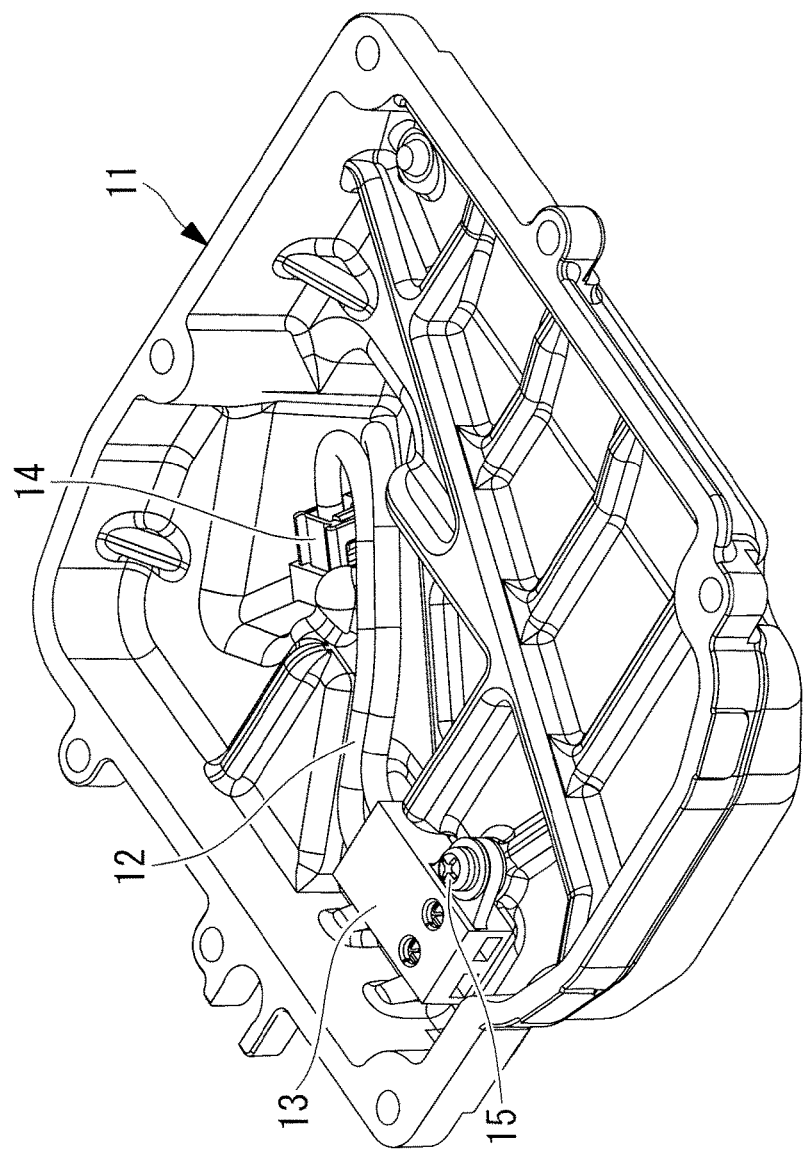
FIG. 4 is a back-side perspective view of a lid body sealing the inverter accommodating section.
Figure 5:
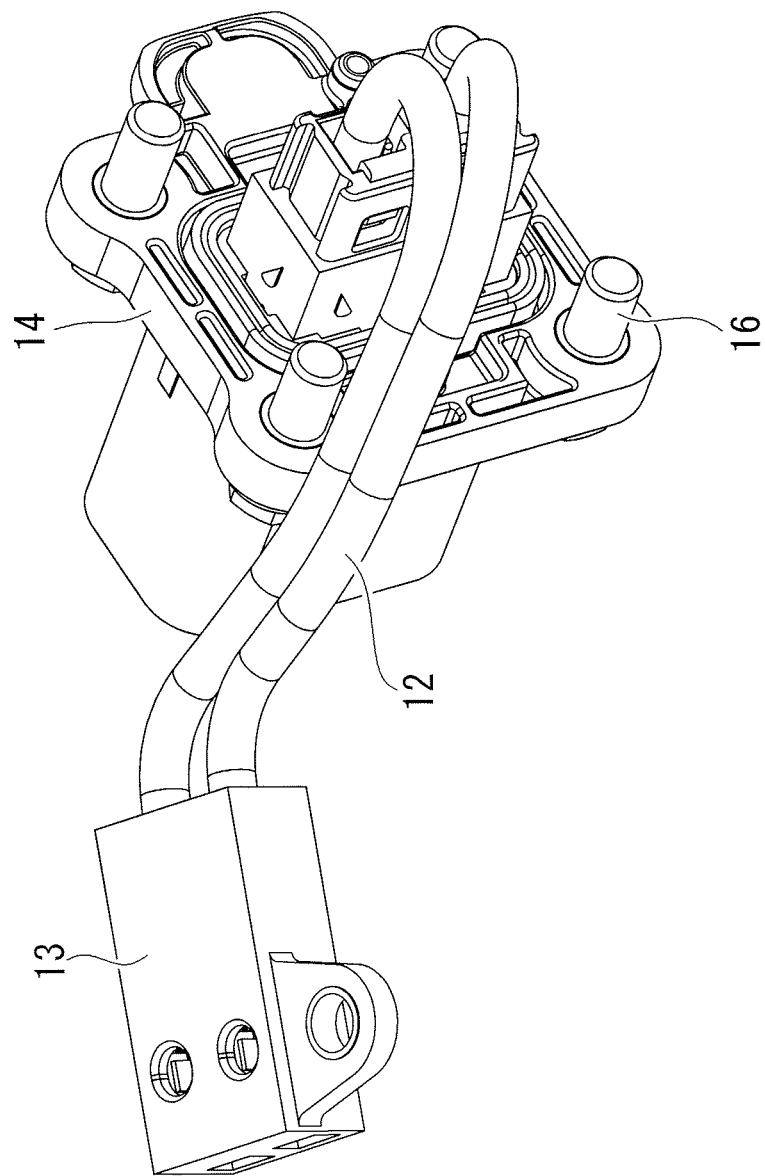
FIG. 5 is a perspective view of a power source cable single body connected to the lid body.

FIG. 1 is a perspective view showing a main part of an inverter-integrated electric compressor according to an embodiment of the present invention. FIG. 2 corresponds to a longitudinal sectional view taken along line a-a in FIG. 1. FIG. 3 is an exploded perspective view of an inverter apparatus installed in an inverter accommodating section. FIG. 4 is a back-side perspective view of a lid body sealing the inverter accommodating section. FIG. 5 is a perspective view of a power source cable single body.

An inverter-integrated electric compressor 1 is provided with a cylindrical housing configuring an outer shell. The housing 2 is configured by integrally connecting an aluminum die-cast motor housing 3 having an electric motor (not shown) built therein, and an aluminum die-cast compressor housing (not shown) having a compression mechanism (not shown) built therein.

The inverter-integrated electric compressor 1 is configured such that an electric motor incorporated in the housing 2 and a compression mechanism are connected to each other via a rotary shaft, and the electric motor is rotational driven via a subsequently discussed inverter apparatus 7, and thereby the compression mechanism is driven, and such that low-pressure refrigerant gas, sucked into the inside of the motor housing 3 via a suction port 4 provided on the rear end side face of the motor housing 3, is sucked via the periphery of the electric motor, and then the low-pressure refrigerant gas is compressed to high pressure in the compression mechanism to be discharged to the inside of the compressor housing and is then sent to the outside.

In the motor housing 3, a plurality of refrigerant flow paths 5 are formed on the inner peripheral surface side to circulate the refrigerant along the axial direction, and a plurality of mounting legs 6 of the electric compressor 1 are provided at the peripheral section of the motor housing 3. Further, an inverter accommodating section 8, in which the inverter apparatus 7 is integrally incorporated, is integrally formed at an outer peripheral section of the housing 2 (the side of the motor housing 3). The inverter accommodating section 8 has a rectangular shape in plan view, and is configured to have a bottom section formed along the outer peripheral wall of the motor housing 3, and a convex ridgeline section 9A formed in a central portion to correspond to the refrigerant flow path 5, and is also configured to have, on each side portion of the convex ridgeline section 9A, a concave section 9B which is formed along the outer peripheral wall of the housing, and at the periphery of which a flange section 10 is erected.

The motor housing 3 is provided with a draft angle combined with the compressor housing and extending from the front end toward the rear side. Further, the cross-sectional area of the refrigerant flow path 5, provided on the inner periphery side of the motor housing 3, is increased from the side of the suction port 4 to the side of the compression mechanism, and hence the ridgeline section 9A, and the like, formed on the inside bottom surface of the inverter accommodating section 8 is also configured to incline downward from the front to the rear.

The inverter accommodating section 8 is configured to be sealed in such a manner that, after the inverter apparatus 7 is incorporated into the inverter accommodating section 8, a lid body 11 shown in FIG. 4 is attached to the flange section 10. A high voltage cable (power source side cables) 12 is provided on the inner surface side of the lid body 11. As shown in FIG. 5, the high voltage cable 12 is provided with a connector 13 on one end side thereof and with a connector terminal 14 on other end side thereof, the connector terminal 14 being connected to a power source side cable. The connector 13 of the one end is provided to be fixedly mounted, by a screw 15, on the inner surface of the lid body 11 at a position corresponding to a P-N terminal 29 provided on a main board 23 described below. The connector terminal 14 on the other end is provided to be fixedly mounted from the outer surface side by a plurality of screws 16 in a state where the terminal portion of the connector terminal 14 is projected to the outer surface side of the lid body 11.

The high voltage cable 12 is a part of the power source side cables and is connected, via the power source side cables, to a power source unit mounted to a vehicle. The connector 13 provided at the one end of the high voltage cable 12 is connected to a P-N terminal 29 provided on the main board 23 of the inverter apparatus 7, and inputs high voltage DC power supplied from the power source unit into the inverter apparatus 7.

As is known, the inverter apparatus 7 converts high voltage DC power, supplied from the power source unit mounted to the vehicle, into three-phase AC power of a required frequency on the basis of commands from an upper control unit (ECU), and applies the three-phase AC power to the electric motor to rotationally drive the electric motor. As shown in FIG. 1 to FIG. 3, the inverter apparatus 7 is integrally incorporated into the inverter accommodating section 8 provided at the outer periphery of the housing 2.

The inverter apparatus 7 is configured by: a plurality of high-voltage system electrical components (hereinafter also simply referred to as electrical components), such as a coil 18 and a capacitor 19, which are each housed in a case and configure a known noise removing filter circuit 17; a plurality of (six) semiconductor switching elements 21 made of heat-generating power transistors, such as IGBTs, which configure a known switching circuit 20 for converting DC power into three-phase AC power; the rectangular main board 23 provided with an inverter circuit including the filter circuit 17 and the switching circuit 20, and a control circuit 22 including a microcomputer, and the like, controlling the inverter circuit; a small sub-board 26 mounted with a communication circuit 25 connected to an upper control apparatus via a communication harness 24, and the like.

It should be noted that the communication harness 24 is configured by a plurality of communication lines used for transmitting and receiving control signals between a vehicle side upper control unit (ECU) and the communication circuits 25 on the side of the inverter apparatus 7, and a plurality of power source lines supplying, from an in-vehicle battery, low voltage (usually 12 V) power used for operating the control circuit 22 and the communication circuit 25, and is connected to the sub-board 26 via a connector 34 as described below.

The inverter apparatus 7 may be, for example, a known apparatus, but here, is mounted with the main board 23 on which electrical components, such as the coil 18 and the capacitor 19, configuring the filter circuit 17, are mounted by soldering lead terminals 18A and 19A of the components, and on which the plurality of (six) semiconductor switching elements 21 made of heat-generating power transistors, such as IGBTs, and configuring the switching circuit 20 are mounted by soldering (total of eighteen lead terminals 21A because an IGBT has three lead terminals 21A).

That is, on the main board 23, the filter circuit 17 and the switching circuit 20 are provided in such a manner that the lead terminals 18A and 19A of the coil 18 and the capacitor 19 configuring the filter circuit 17, and the lead terminals 21A of the plurality of semiconductor switching elements 21 configuring the switching circuit 20 are made to respectively pass through through-holes of the main board 23, and are respectively soldered to patterns on the main board 23 so as to be mounted on the main board 23. The main board 23 has a size to be accommodated in the rectangular inverter accommodating section 8, and the four corners of the main board 23 are tightened and fixed, via screws 28, to boss sections 27 provided at the four corners of the inverter accommodating section 8.

The capacitor 19, which is one of the high-voltage system electrical components configuring the filter circuit 17, is configured to be accommodated in a case which has, as is shown in FIG. 2 and FIG. 3, a rectangular outer shape (rectangular parallelepiped shape) and has a flat planar upper surface. Similarly, the coil 18 rolled into a cylindrical shape is configured to be accommodated in a semi-cylindrical case having a flat planar upper surface. Further, the coils 18 and the capacitor 19 are mounted in parallel with each other along one side of the rectangular main board 23.

It is configured such that the coil 18 and the capacitor 19, which are mounted on the main board 23, are fixedly mounted, via an adhesive, on a bottom surface serving as the concave section 9B which is an one side portion along the axial direction of the outer peripheral wall of the cylindrical housing 2, the outer peripheral wall configuring the inner bottom surface of the inverter accommodating section 8, and such that the lower surface of the main board 23 is supported by each of the flat upper surfaces of the coil 18 and the capacitor 19 to be able to withstand stress and vibration applied to the main board 23. Further, it is configured such that the P-N terminal 29, which inputs DC power from a power source into the inverter apparatus 7 by being connected to the connector 13 of the high voltage cable 12, is erected upward from the upper surface side of the portion which is supported by the capacitor 19 and which is a part of the main board 23 whose under surface is supported by the coil 18 and the capacitor 19.

Further, as shown in FIG. 3, the plurality of (six) semiconductor switching elements 21 are fixedly mounted on a heat dissipation block 30 erected from the concave section 9B which is the other side portion along the axial direction of the outer peripheral wall of the cylindrical housing 2, the outer peripheral wall configuring the inner bottom surface of the inverter accommodating section 8. The heat dissipation block 30 is a rectangular block body having a predetermined length and made of an aluminum alloy which is a thermally conductive material. A three-dimensional arrangement is configured such that the three semiconductor switching elements 21, each having three vertically-directed lead terminals 21A, are screwed and fixed on each of vertical side surfaces on right and left sides of the heat dissipation block 30. The heat dissipation block 30 has a function of dissipating heat generated by the semiconductor switching elements 21 to the side of the housing 2 to cool the semiconductor switching elements 21.

As shown in FIG. 1, by passing through through-holes 23A provided along the other side opposite to the one side on which the coil 18 and the capacitor 19 of the main board 23 are supported, the total eighteen lead terminals 21A of the plurality of (six) semiconductor switching elements 21 are projected upward to be soldered and mounted on the main board 23. With this configuration, the other side opposite to the one side of the main board 23 is supported from below via the many lead terminals 21A of the plurality of semiconductor switching elements 21. It should be noted that the heat dissipation block 30 is screwed and fixed on the concave section 9B in the inverter accommodating section 8, but it may also be configured such that the heat dissipation block 30 is integrally molded on the side of the motor housing 3.

Figure 6:
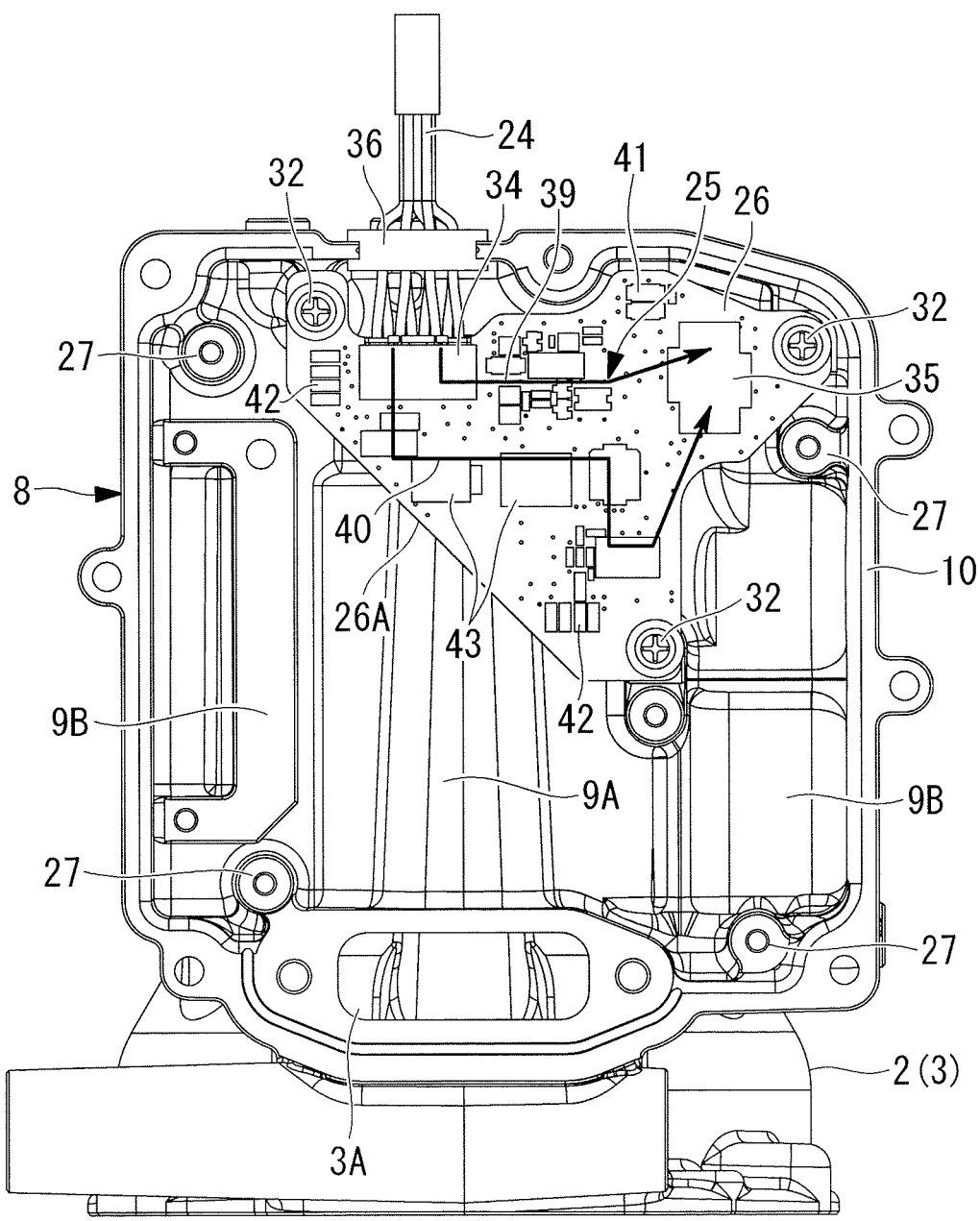
FIG. 6 is a plane arrangement view of a sub-board arranged in the inverter accommodating section, and shows a power source line and a communication line, and the flow of noise entering the lines.

Further, as shown in FIG. 3 and FIG. 6, so as not to be in contact with the convex ridgeline section 9A, the sub-board 26 mounted with the communication circuit 25 is tightened and fixed, via fixing screws 32, to three boss sections 31 integrally molded on the motor housing 3 at a portion below the main board 23 and at a rear portion on the bottom surface side of the inverter accommodating section 8. The sub-board 26 is formed as a small board which is rather small as compared with the main board 23. In view of the vibration resistance, the sub-board 26 is formed as a substantially triangular board having a shape widened from the front end side to the rear end side, and is fixedly mounted, as described above, at three portions, one of which is positioned at the front end of the board, and two of which are respectively positioned at the rear ends of the board.

It is preferable that the sub-board 26 be arranged in a space between the coil 18 and the capacitor 19 used in the filter circuit 17, and the plurality of semiconductor switching elements 21 used in the switching circuits 20, which are respectively provided on each of the left and right sides of the inverter accommodating section 8. It is also preferable that the sub-board 26 be installed so that the distance between the sub-board 26 and the main board 23 arranged above the sub-board 26 is made as large as possible. The sub-board 26 and the main board 23 arranged above the sub-board 26 are arranged such that an inter-board connection terminal 33 (see FIG. 3) provided on the side of the main board 23 can be electrically and mechanically connected to a connection connector 35 provided on the sub-board 26.

Further, as shown in FIG. 3 and FIG. 6, it is configured such that the sub-board 26 is connected to the communication harness 24 via a connector 34, such that the connecting portion of the connector 34 is provided on the one end side of the rear end side close to the fixing screw 32 of the sub-board 26, and such that the connection connector 35 connected to the upper side main board 23 is arranged close to the fixing screw 32 on the other end side. On the other hand, the communication harness 24 is penetrated into the inverter accommodating section 8 via a grommet 36 provided at a cutout section 10A provided in the flange section 10 of the inverter accommodating section 8, and is connected, via the connector 34, to the sub-board 26 at a position closest to the portion at which the communication harness 24 is fixed by the grommet 36.

It is configured such that, through the switching circuit 20 of the inverter apparatus 7, the power converted from DC power into three-phase AC power is outputted from the main board 23 to a glass sealing terminal 38 via a UVW bus bar 37. The glass sealing terminal 38 is installed in a terminal installation hole 3A (see FIG. 3) provided at a front portion in the inverter accommodating section 8 so as to pass through the motor housing 3, and applies the three-phase AC power from the UVW bus bar 37 to the electric motor provided in the motor housing 3. The UVW bus bar 36 installed on the main board 23 is connected to the glass sealing terminal 38.

Figure 7:
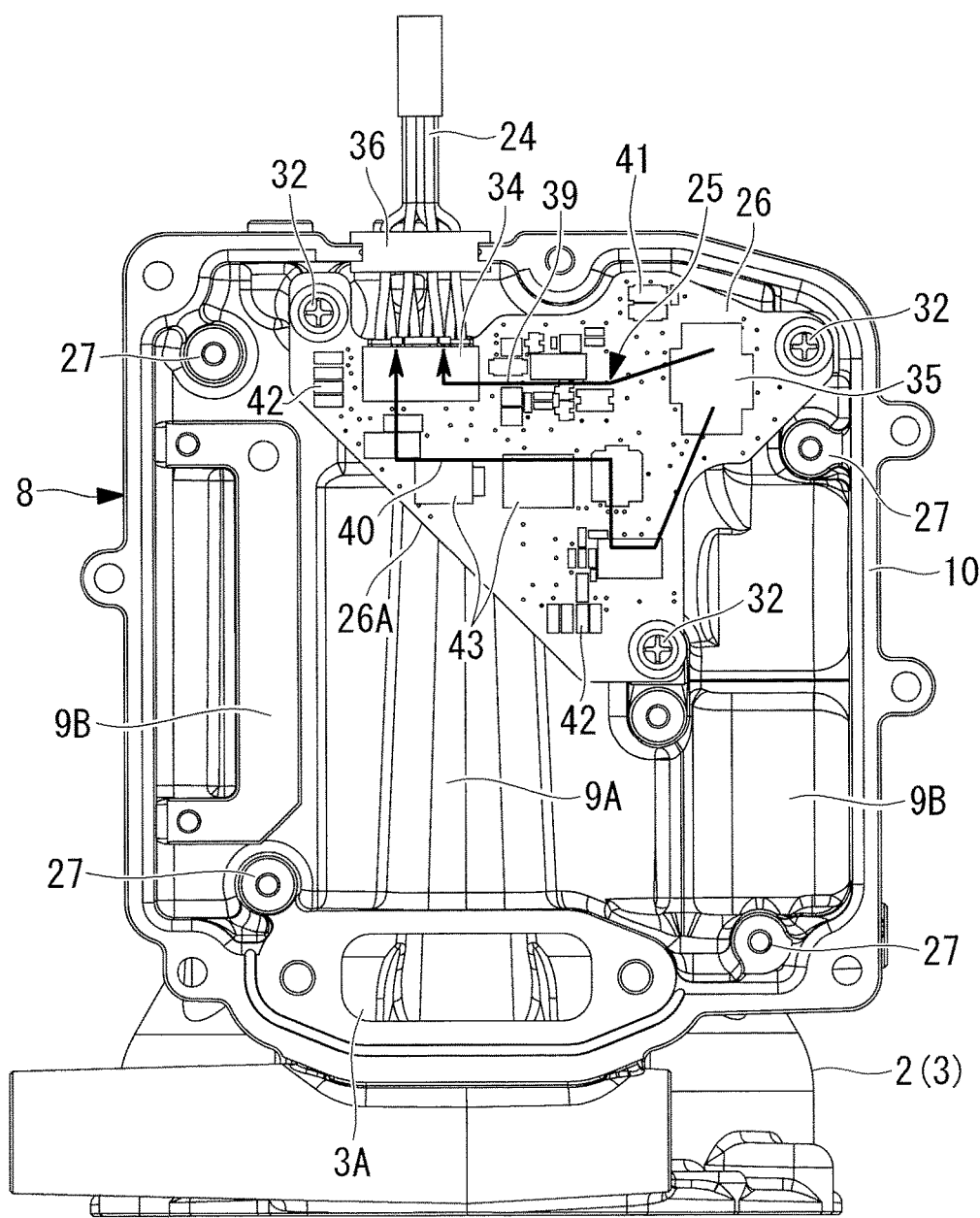
FIG. 7 is a plane arrangement view similar to that in FIG. 6, and shows the power source line and the communication line, and the flow of noise emitted from the lines.

Next, with reference to FIG. 6 and FIG. 7, measures are described for improving the immunity performance against electromagnetism noise entering the inverter apparatus 7 from outside via the communication line and the power source line of the communication harness 24, and electromagnetism noise generated by the switching circuit 20 of the inverter apparatus 7 and emitted to the outside via the communication line and the power source line of the communication harness 24.

As described above, the sub-board 26 connected to the communication harness 24 is mounted with the communication circuit 25. The sub-board 26 is a small board which is divided from the main board 23 and formed into a substantially triangular shape, and which is arranged at a distance below the main board 23 and is tightened and fixed, via the fixing screws 32, to the boss sections 31 respectively provided at three portions on the side of the housing 2.

It is configured such that, on the sub-board 26, the connector 34 provided on the side of the communication harness 24 is arranged so as to be close to the fixing screw 32 for fixing the one end side of the rear end side of the sub-board 26, such that the connection connector 35 for connection with the main board 23 is arranged so as to be close to the fixing screw 32 for fixing the other end side of the rear end side of the sub-board 26, and such that a communication line 39 is arranged along the rear end side of the sub-board 26 so as to connect the connector 34 to the connection connector 35, and also a power source line 40 is arranged along a triangular line passing through the vicinity of the fixing screw 32 provided at the portion (other portion) other than the portions of the other two fixing screws 32.

The communication line 39 is connected to a noise suppression component (for example, diode) 41 which is provided at a position close to the connection connector 35 so as to be connected to a frame ground (GND) (not shown) of the sub-board 26. Further, at a position close to the connector 34 and a position close to the fixing screw 32 provided at the other portion, the power source line 40 is connected to a plurality of noise suppression components (for example, chip capacitors) 42 arranged so as to be connected to the frame ground (GND) of the sub-board 26. Further, in addition to the noise suppression components 42, the power source line 40 is connected, at middle positions on the line, to a plurality of noise suppression components (for example, chip capacitors) 43 arranged so as to be connected to the frame ground (GND) of the sub-board 26.

On the other hand, the frame ground (GND) of the sub-board 26 is grounded on the side of the housing 2 via the fixing screws 32 provided at the three portions for tightening and fixing the sub-board 26. Therefore, electromagnetism noise, removed, via the noise suppression components 41, 42 and 43, from the communication line 39 and the power source line 40 which are provided on the sub-board 26, is released to the ground via the frame ground (GND), the fixing screws 32, and the housing 2.

That is, although noise, entering into the sub-board 26 from outside through the communication harness 24, flows on the communication line 39 and the power source line 40 in the arrow direction shown in FIG. 6, the noise is removed by the noise suppression components 41 connected to the communication line 39, and the noise suppression components 42 and 43 connected to the power source line 40, and is thereby prevented from entering into the control circuit 22, and the like, on the side of the main board 23 through the connection connector 35.

Further, noise, generated by the switching circuit 20, and the like, on the side of the inverter apparatus 7, enters into the sub-board 26 from the main board 23 through the inter-board connection terminal 33 and the connection connector 35, flows, in the arrow direction shown in FIG. 7, on the communication line 39 and the power source line 40, so as to be emitted to the outside through the communication harness 24. However, while the noise flows through the communication line 39 and the power source line 40 which are provided on the sub-board 26, the noise is removes by the noise suppression components 41, 42 and 43 connected to the lines 39 and 40, and is thereby prevented from being emitted to the outside.

According to the configuration described above, the present embodiment provides the following advantages.

The inverter apparatus 7 integrally incorporated in the inverter accommodating section 8 of the housing 2 converts, by the switching circuit 20, high voltage DC power, inputted from the power source unit via the power supply side cable (high voltage cable 12, and the like), into three-phase AC power having a required frequency, applies the three-phase AC power to the electric motor via the UVW bus bar 37 and the glass sealing terminal 38 to drive the electric compressor 1 at a predetermined rotational speed, so that the operation for compressing the refrigerant is performed. On the other hand, the inverter apparatus 7 is controlled via the control circuit 22 on the basis of control signals which are inputted and outputted from and to the upper control unit (ECU) via the communication harness 24.

In this case, the communication line and the low voltage power line, which configure the communication harness 24, function as antennas which receive electromagnetism noise from the outside or which emit, to the outside, electromagnetism noise generated on the side of the inverter apparatus 7. The reception and emission of the noise may cause malfunction of the inverter apparatus 7 and other mounted devices. In order to prevent the malfunction, it is necessary to meet standards set by each manufacturer in a radiation immunity test and an injection immunity test for such electromagnetic noise.

Nevertheless, the present embodiment is configured such that the inverter circuit board is divided into the main board 23 and the small sub-board 26, and the sub-board 26 is arranged at a portion below the main board 23. The compact sub-board 26 is formed as a board on which the communication circuit 25 is mounted, and to which the communication harness 24, including the communication line and the power source line, is connected via the connector 34. Also, the sub-board 26 is connected with the main board 23 via the inter-board connection terminal 33 and the connection connector 35, and is tightened and fixed, by the fixing screws 32, on the side of the housing 2 at at least three or more points arranged in a polygonal pattern. Further, the sub-board 26 is configured such that the connector 34 and the connection connector 35 are respectively arranged to be close to the fixing screws 32 provided at two portions, such that the communication line 39, connected to the noise suppression component 41 connected to the frame ground of the sub-board 26, is arranged between the connectors 34 and 35, and such that the power source line 40, connected to the noise suppression components 42 and 43 connected to the frame ground, is arranged along the triangular line passing through the vicinity of the fixing screw 32 provide at the portion other than the two portion of the fixing screws 32. The frame ground is grounded on the side of the housing 2 via the fixing screws 32.

For this reason, a board, on which the communication circuit 25 is mounted, and to which the communication harness 24 is connected, is separated, as the sub-board 26, from the main board 23, and the noise suppression components 41, 42 and 43 connected to the frame ground (GND) are, as described above, connected to the communication line 39 and the power source line 40 which are arranged on the sub-board 26. Thereby, noise entering the inverter apparatus 7 from outside through the communication harness 24 is removed on the sub-board 26 to be prevented from reaching the control circuit 22 on the main board 23. Further, noise generated by the switching circuit 20, and the like, of the inverter apparatus 7 is removed on the sub-board 26 while being transmitted from the main board 23 to the communication harness 24 via the sub-board 26. Thereby, the noise generated by the switching circuit 20, and the like, can be prevented from being emitted to the outside via the communication harness 24. As a result, the entering noise and the generated noise are transmitted from the frame ground (GND) of the sub-board 26 to the side of the housing 2 via the fixing screws 32, to be released to the ground.

Thereby, noise entering or emitted via the communication line and the power source line of the communication harness 24 can be reduced, so that the noise immunity performance can be improved. Also, all noise measures can be provided on the sub-board 26, so that the configuration can be simplified, and electromagnetic noise can be more accurately removed. Further, the sub-board 26 is arranged at a portion below the main board 23 and closer to the housing 2, so to be apart from the main board 23 at a fixed distance. Thereby, noise interference between the boards is prevented, so that the noise resistance on the side of the sub-board 26 can be more improved. Further, the inverter circuit board is divided into the two boards 23 and 26, and hence the area of each of the boards can be minimized, so that the vibration resistance can be improved.

Further, the sub-board 26 is formed into a substantially triangular shape, and is tightened and fixed on the side of the housing 2 by the fixing screws 32 provided at the three corner portions of the board. Therefore, the size of the sub-board 26 can be miniaturized as much as possible. Further, noise, flowing through the communication line 39 and the power source line 40 which are arranged along the geometric shape of the sub-board 26, is removed by the noise suppression components 41, 42 and 43 respectively arranged close to the plurality of fixing screws 32. The noise is transferred to the side of the housing 2 from the fixing screws 32 close to the noise suppression components 41, 42 and 43 via the frame ground (GND) connected to each of the noise suppression components 41, 42 and 43, and the noise transferred to the side of the housing 2 is released to the ground. Therefore, on the miniaturized sub-board 26, the arrangement portions of the noise suppression components 41, 42 and 43 and the grounding portions are accurately secured, so that the noise resistance can be further improved.

Further, the present embodiment is configured such that the communication line 39 is grounded to the fixing screw 32 close to the connection connector 35 via the noise suppression component 41 arranged close to the connection connector 35, and such that, via the noise suppression component 42 arranged close to the connector 34 connected to the communication harness 24, and via the noise suppression component 42 arranged close to the fixing screw 32 provided at the other portion, the power source line 40 is grounded to the fixing screw 32 provided close to the connector 34 and the fixing screw 32 provided at the other portion.

For this reason, the noise suppression components 41 and 42 are respectively arranged at positions suitable for the communication line 39 and the power source line 40 which are arranged on the sub-board 26. Further, since the noise suppression components 41 and 42 can be respectively grounded to the fixing screws 32 at the closest positions via the frame ground (GND) of the sub-board 26, noise entering or emitted via the sub-board 26 is removed, so as to be promptly grounded to the side of the housing 2. Thereby, the noise measure can be taken easily, surely and simply, which makes it possible to surely meet the noise immunity performance required from each car manufacturer.

Further, in the present embodiment, at least one or more of the noise suppression components 43 are provided at middle positions on the power source line 40 and other than the vicinity of the fixing screws 32. Therefore, at least one or more of the noise suppression components 43, which are provided at middle positions between the two fixing screws 32, can be provided to the power source line 40 arranged along the triangular line. Thereby, the number of the noise suppression components 43 is increased, so that the noise rejection performance can be further improved. Therefore, the noise resistance on the side of the power source line 40 is further improved, so that EMC characteristics can be improved as a whole.

It should be noted that the present invention is not limited to the above-described embodiment, and various modifications can be suitably possible within the spirit and scope of the present invention. For example, in the above-described embodiment, a substantially triangular compact board is used as the sub-board 26, but the sub-board 26 is not limited to the triangular shape. A rectangular board, a trapezoidal board, or another quadrilateral board may also be used as the sub-board 26, so as to be tightened and fixed by the fixing screws 32 at four corner portions of the board. In this case, the noise rejection measure can be implemented in such a manner that the connector 34 and the connection connector 35 are arranged close to the fixing screws 32, and that the communication line 39 and the power source line 40 are arranged substantially similarly to the above-described embodiment.

Further, as examples of the noise suppression components 41, 42 and 43, diodes are provided on the side of the communication line 39, and chip capacitors are provided on the side of the power source line 40. However, the noise suppression components are not limited to these, and it is obvious that other components having similar functions may be use.

REFERENCE SIGNS LIST

1 Inverter-integrated electric compressor
2 Housing
7 Inverter apparatus
8 Inverter accommodating section
23 Main board
24 Communication harness
25 Communication circuit
26 Sub-board
32 Fixing screw
34 Connector
35 Connection connector
39 Communication line
40 Power source line
41, 42, 43 Noise suppression component

The invention claimed is:

1. An inverter-integrated electric compressor having a housing including a inverter accommodating section integrally incorporating therein an inverter apparatus including an inverter circuit board, wherein:

the inverter circuit board is divided into a main board installed in an upper portion of the inverter accommodating section, and a sub-board installed in a portion below the main board, the sub-board being smaller than the main board;

the sub-board is mounted with a communication circuit and connected to a communication harness via a connector, and is also connected to the main board via a connection connector and tightened and fixed, via fixing screws, at three or more points arranged in a polygonal pattern on the side of the housing;

the connector and the connection connector are respectively arranged close to two of the fixing screws, and a communication line, connected to a noise suppression component connected to a frame ground of the sub-board, is arranged between the connector and the connection connector, and a power source line connected to a noise suppression component connected to the frame ground is arranged along a triangular line passing through the vicinity of the fixing screw provided at an other portion other than the portions of the two fixing screws; and the frame ground of the sub-board is grounded on the side of the housing via the fixing screws.

2. The inverter-integrated electric compressor according to claim 1, wherein the sub-board is formed as a triangular or quadrilateral board, and is tightened and fixed on the side of the housing by the fixing screws provided at three or four portions arranged at the corners of the triangular or quadrilateral board.

3. The inverter-integrated electric compressor according to claim 1, wherein, via the noise suppression component provided close to the connector connected to the communication harness, and via the noise suppression component provided close to the fixing screw provided at the other portion, the power source line is grounded to the fixing screw provided close to the connector and to the fixing screw provided at the other portion.

4. The inverter-integrated electric compressor according to claim 1, wherein, via the noise suppression component arranged close to the connection connector, the communication line is grounded to the fixing screw close to the connection connector.

5. The inverter-integrated electric compressor according to claim 3, wherein at least one or more of the noise suppression components are provided at middle positions which are provided on the power source line and not close to the fixing screws.

* * * * *